E. L. FLOWERS.
OILING MECHANISM FOR CREAM SEPARATORS.
APPLICATION FILED DEC. 11, 1914.
1,168,874.
Patented Jan. 18, 1916.
2 SHEETS—SHEET 1.
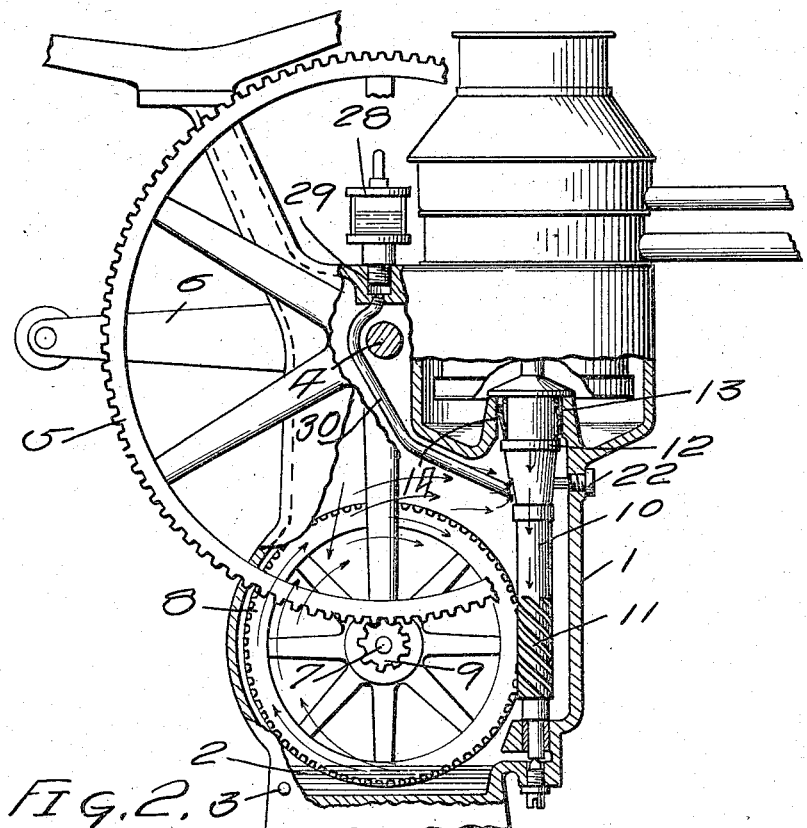
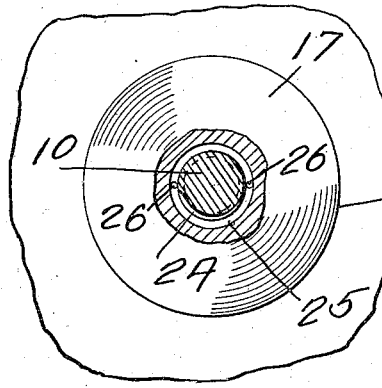
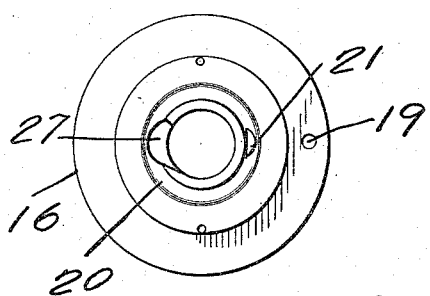
Inventor
E. L. Flowers

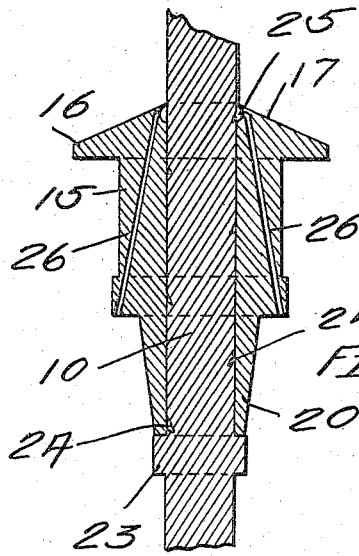
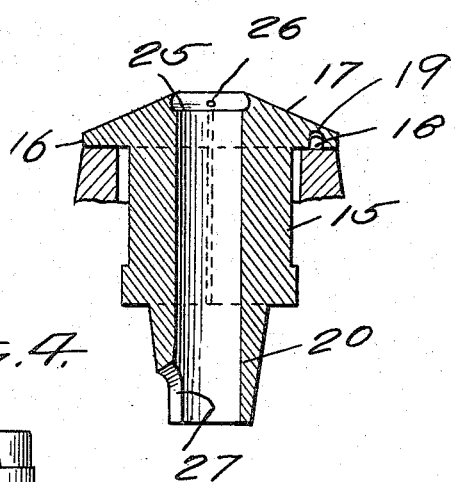
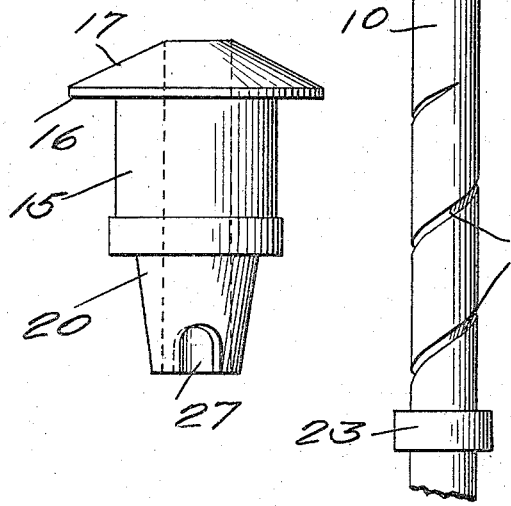
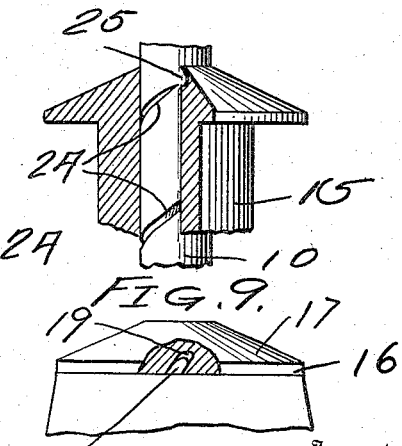

UNITED STATES PATENT OFFICE.

EDGAR LEE FLOWERS, OF HICKORY, NORTH CAROLINA, ASSIGNOR TO J. L. BLODGETT, OF ALEXANDRIA, MINNESOTA.

OILING MECHANISM FOR CREAM-SEPARATORS.

1,168,874.  Specification of Letters Patent.  Patented Jan. 18, 1916.

Application filed December 11, 1914.  Serial No. 876,729.

*To all whom it may concern:*

Be it known that I, EDGAR LEE FLOWERS, a citizen of the United States, residing at Hickory, in the county of Catawba, State of North Carolina, have invented certain new and useful Improvements in Oiling Mechanism for Cream-Separators; and I do hereby declare the following to be a full, clear, and exact description of the invention, such as will enable others skilled in the art to which it appertains to make and use the same.

This invention relates to an oiling mechanism for cream separators and particularly to means for automatically oiling the separating bowl spindle.

In the machines used at the present time great difficulty has been encountered in oiling the bearing of the separator bowl spindle in such manner that dust, water, milk, and in fact any other foreign substances will be excluded from the said bearing. The presence of these foreign substances in the bearing will cause the spindle and the gearing for rotating the same to become rusted and worn so that the said spindle will be no longer freely rotatable and thus the value of the machine greatly reduced. When the gearing becomes rusted both the driving gear and the spindle must be removed and polished, thus removing the rust, before the machine will be again restored to such condition that it may be successfully operated. When the bearing for the spindle or the spindle itself becomes worn, because of the presence of grit, or for the lack of oiling, the bearing or spindle or both, as the case may be, must be removed and replaced by new parts.

In the separators used, commercially, at the present time the separator bowl spindle is oiled by manually controlled oiling mechanism which necessitates an action on the part of the operative before oil will be fed to the said spindle and bearing therefor.

An object of my invention resides in the provision of means whereby the separator bowl spindle and bearing therefor will be automatically oiled during the operation of the machine.

A further object of the invention resides in so constructing the oiling means that all foreign substances such as water, milk and dust will be excluded from the bearing and shaft.

A further object of the invention resides in so constructing the device that the necessity for removing the spindle, driving gear therefor and the bearing, in order that they may be cleaned or repolished, is obviated.

A still further object of the invention resides in constructing the device in such manner that the separator will be rendered exceedingly sanitary.

With these and other objects in view, such as will appear as the description progresses, my invention comprises the combinations and arrangements of parts as set forth in and falling within the scope of the appended claims.

Referring to the drawing: Figure 1 is a vertical sectional view of a portion of a separator showing my device in place therein and in elevation, only such parts of the separator being shown as are necessary to illustrate the coöperation of my device therewith. Fig. 2 is a horizontal sectional view showing the relation of the bearing, spindle, and the casing for the separator bowl. Fig. 3 is a longitudinal sectional view of the bowl spindle and bearing removed, showing the ducts for conveying the oil from the upper portion of the bearing back to the oil container. Fig. 4 is an elevational view of the spindle removed from the bearing. Fig. 5 is a vertical sectional view of the bearing showing one of the oil conveying ducts. Fig. 6 is an enlarged elevation of the bearing showing the oil catching opening. Fig. 7 is a bottom plan view of the bearing, showing the oil catching opening, oil ducts and the seat finding opening. Fig. 8 is a fragmental view showing the relation of the oil trough and chamber. Fig. 9 is an elevation of a portion of the upper part of the upper bearing seat of the bowl-driving spindle and the corresponding portion of the bearing member, a part being in section to show the arrangement of the pin and socket that preclude vertical movement of the bearing member from its seat and serves to urge the bearing member onto its seat under the influence of the rotary motion of the spindle.

In the accompanying drawings, I have shown a particular embodiment of my device for the sake of convenience of illustration, but I wish it to be here understood that the details of construction may be varied without departing from the spirit of the invention or without exceeding the scope of the appended claims.

Referring to the drawings wherein like parts are indicated by like characters throughout the several views: The frame of the separator is indicated generally by the reference character 1, which frame has an oil containing chamber 2 from the bottom of which oil and sediment may be drained through the cock 3. Rotatably mounted on the upper end of the frame 1 is a main drive shaft 4, to one end of which is secured a gear 5 and to the other end of which is secured an operating crank handle 6. The middle portion of this shaft 4 is exposed to the oil chamber 2. Rotatably mounted within the oil chamber is a shaft 7 to which is secured a gear 8 having helical teeth thereon, which gear and shaft are driven by the intermeshing of a pinion 9 on the end of the shaft with the gear 5. The lower portion of this gear 8 extends below the level of the oil in the chamber 2 and thus, during its rotation, flings oil upwardly onto the shaft 4 thus lubricating the same and also onto the separator bowl spindle in a manner which will later appear.

A vertically extending bowl spindle 10 is mounted within the chamber 2 of the casing 1 and has helical grooves 11 which intermesh with the teeth on the gear 8 so that as the said gear is rotated the spindle will be likewise rotated. The said spindle 10 extends upwardly through a bearing 12 which is mounted in a seat 13 and is maintained, normally, in a vertical position by a spring collar 14 which encircles the same and bears against the seat 13. This bearing 12 consists of a barrel 15 which is located within the seat 13, and a flange 16 formed on the upper end of the barrel and resting against the upper edge of the said seat 13. This flange is of frusto-conical formation so as to form a shedding surface 17 and is maintained in place upon the seat by the coöperation of a lug 18 on the upper edge of the said seat and a depression 19 in the under face of the collar. This bearing further includes a sleeve 20 which extends downwardly from the barrel 15, is integral therewith, and has a depression 21 in one side thereof with which a screw 22 may be engaged to prevent the said bearing from lateral displacement. The lower end of this sleeve 20 is in slight spaced relation to the upper face of a collar 23 on the spindle 10 so that there will be no friction between the collar and bearing.

In order that the spindle 10 may be freely oiled during its rotation within the bearing 12, I have provided the said spindle, above the collar 23, with a helical trough 24 which may be of various formations, but which is shown in the drawing in its preferred formation, so that a pocket is formed in which oil may be caught. This trough is so arranged on the spindle that, during the rotation of the same, the oil will be lifted in the trough throughout the entire length of the bearing 12. Of course it is to be understood that during the uplifting of the oil a portion of the same escapes from the trough and thus lubricates the bearing. As the trough progresses upwardly it is gradually decreased in depth so that the oil adjacent the upper end of the groove is forced therefrom during the rotation of the spindle. The upper end of this trough terminates in vertical alinement with an annular chamber 25 which is formed by enlarging the hole through the bearing 12 at its upper end. Thus as oil is caught in the lower end of the trough it is conveyed upwardly in the same and empties in the chamber 25 from whence it escapes through a plurality of ducts 26 which extend downwardly through the barrel 15 of the bearing 12 and into the oil chamber 2. It will thus be seen that inasmuch as the trough is continuously full of oil that virtually an oil cushion will be provided between the bearing 12 and the spindle 10.

In order that the oil may be caught as it is flung against the spindle 10 and the sleeve 20 of the bearing 12 from the gear wheel 8, I have provided in the lower edge of the said sleeve 20 a substantially arcuate cut-out portion 27, one edge of which recedes inwardly, thus forming an accumulator in which the oil is caught and retained until picked up by the trough during the rotation of the spindle 10. This action is accomplished because of the fact that the spindle moves, in its rotative movement, from one edge of the cut-out portion 27 toward the inwardly receding edge of the said cut-out portion.

Oil is supplied to the chamber 2 through the usual filling opening which is well understood in this class of machines and to insure a supply of clean oil to the bearing surfaces of the spindle and member 15, an oil cup 28 is provided which is engaged in the opening 29 and from which opening leads a feed tube 30 which terminates within the accumulator opening 27 just short of the face of the spindle. If this tube is of sufficient size it will supply the entire quantity of oil used between the spindle and its bearing member 15 but if the tube is made smaller than the accumulator opening 27, then as the gear 8 rotates the oil which has been previously put in the container 2 is flung into the accumulator opening in conjunction with what passes from the tube 30, onto the spindle and into the helical trough formed therein.

As the trough 24 passes the accumulator it gathers the oil therefrom and moves the same upwardly forming the oil cushion between the bearing and the spindle which has been previously described. The oil is finally thrown into the chamber 25 and is conveyed therefrom into the container 2 through the ducts 26. It will be of course realized that this oil is forced through the ducts 26 by the new oil which is being forced into the chamber.

From the foregoing description it will be seen that I have provided a device by means of which the separator bowl spindle of a cream separator will be automatically oiled.

I have still further constructed the device in such manner that the bearing for the bowl spindle is formed in such manner as to exclude all foreign substances therefrom. Thus I have provided a mechanism whereby a cream separator may be rendered exceedingly sanitary inasmuch as the oiling of the moving parts is accomplished entirely from the interior of the frame.

It will be obvious that the use of this device is not confined to separators, but the device has an exceedingly wider scope of uses and I therefore do not wish to be limited to the use of the device to separators only.

Referring again to the lug 18 and the depression or socket 19, it will be noted upon reference to Fig. 9 of the drawings that the pin ranges angularly of the bearing member in a direction opposite to the rotation of the spindle so that the tendency of the bearing member to follow the spindle causes the bearing member to be drawn downwardly by the lug or pin 18 and thus hold the lower face of the flange 16 with such snugness against the upper end face of the seat 13 as to prevent any possibility of ingress of fluid at such times as when the basin may become flooded, as when the bottom of the bowl is not fluid-tight. Furthermore, the angular ranging of the lug or pin necessitates a slight backward rotary movement of the bearing member 15 before it may be raised from its seat. Thus, when the bowl is lifted from the spindle upon discovery of flooding of the basin, the bearing member does not lift from its seat and passage of the flood between the bearing and its seat and thence into the lower portion of the casing, is prevented.

What is claimed as new is:

1. A cream separator including a bowl-driving spindle provided with a bearing and including, also, means for feeding a lubricant through said bearing in the direction of the bowl whereby foreign matter from the bowl will be prevented from entering between the bearing and spindle, and a shed at the top of the bearing for receiving the foreign matter after it has been excluded from the bearing by said means.

2. A cream separator including a bowl-driving spindle, a bearing member having a shed extending continuously about the spindle at the bowl end of the bearing, means disposed to catch matter from the shed, the said separator including, also, means for maintaining an oil packing between the spindle and shed end of the bearing whereby foreign matter is excluded from the bearing, the said shed being constructed and arranged to receive the foreign matter after it has been excluded from the bearing by the oil packing.

3. A cream separator including a bowl-driving spindle, a bearing for the spindle having a closed spindle encircling chamber in the end of its bearing face toward the bowl end of the spindle, and including also means for feeding a lubricant between the bearing faces of the spindle and bearing to said chamber.

4. A cream separator including a bowl-driving spindle, a bearing for the spindle having a spindle encircling chamber in the end of its bearing face toward the bowl end of the spindle, and including also means for feeding a lubricant between the bearing faces of the spindle and bearing to said chamber, the bearing having an oil conveying duct leading from the chamber, the said chamber being closed except for the oil conveying duct.

5. A cream separator having a bowl-driving spindle, a bearing member for the spindle having a spindle encircling chamber in its bearing face toward the bowl end of the spindle, said bearing member having an oil conveying duct leading from the chamber and having a passage leading through its bearing surface and ranging in the direction of rotation of the spindle therein, the spindle having a trough extending helically thereof from said passage to said chamber and extending in a direction opposite to that of rotation of the spindle.

6. A cream separator having a bowl-driving spindle, a bearing member for the spindle having a spindle encircling chamber in its bearing face toward the bowl end of the spindle, said bearing member having an oil conveying duct leading from the chamber and having a passage leading through its bearing surface and ranging in the direction of rotation of the spindle therein, the spindle having a trough extending helically thereof, from said passage to said chamber and extending in a direction opposite to that of rotation of the spindle, and an oil feed leading to the passage.

7. In a cream separator including a casing having an upper bowl receiving portion and a lower driving mechanism receiving portion and a bearing seat between the two, a bearing member on the seat, in which the bowl-driving spindle is disposed, and means active under the influence of rotary motion of the spindle for holding the bearing member to its seat.

8. In a cream separator, the combination with a two-part casing having a seat between the two parts, of a shaft bearing disposed in the seat, said bearings having means actuated by movement of the shaft in its bearing for holding the bearing member to its seat.

9. The combination with a bearing seat of a bearing member therein adapted to receive a movable body, said bearing having means active under the influence of movement of said body for holding the bearing to its seat.

10. In a cream separator, including a bowl-driving spindle, the combination with a two-part casing having a seat between the two parts, of a bearing member for the bowl-driving spindle disposed in the seat, the seat having a pin and the bearing member having a socket in which the pin is slidably received, said pin and socket ranging angularly of the bearing in a direction opposite to the operative rotation of the spindle in the bearing.

11. A cream separator comprising a bowl having a driving spindle provided with a bearing and a shed above the bearing, the separator embodying means for supplying a lubricant upwardly of the bearing, the said shed and lubricant being adapted to coöperate to maintain the bearing free from foreign matter.

12. A cream separator including a spindle and a bearing member for said spindle, said bearing member having a cut-out portion at the lower edge thereof, the said spindle having a collar thereon below the said cut-out portion, the said spindle being provided further with a circumscribing, upwardly progressing trough, the lower end of which passes the cut-out portion during the revolution of the spindle.

13. A cream separator including a bowl driving spindle and a bearing member therefor, the said bearing member having a passage through the bearing face thereof, the said passage being provided with an inwardly receding edge toward which the spindle moves in its movement across the passage and the said spindle having means thereon for lifting a lubricant from the said passage.

14. A cream separator including a bowl casing, a bowl-driving spindle extending upwardly into said casing and including, also, means for preventing the escape of foreign matter from the casing by way of the spindle.

15. A cream separator including a bowl casing, an oil reservoir, a bowl-driving spindle extending from one into the other and provided with a bearing, the separator including, also, means for maintaining a body of lubricating oil, at rest, at the casing end of the spindle bearing whereby foreign matter is excluded from the bearing.

16. A cream separator including a bowl casing, an oil reservoir located below the same, a bowl-driving spindle extending from the former into the latter, the separator including, also, means for preventing the gravitation of matter on the bowl spindle from the bowl casing to the oil reservoir.

17. A cream separator including a spindle and a bearing therefor, the separator including, also, means for feeding a lubricant upwardly into the bearing, the said bearing having a chamber encircling the spindle, which chamber is closed by the spindle.

In testimony whereof, I affix my signature, in the presence of two witnesses.

EDGAR LEE FLOWERS.

Witnesses:
 HENRY E. COOPER,
 D. L. MORRIS.